US010955872B2

(12) United States Patent
Maddukuri et al.

(10) Patent No.: US 10,955,872 B2
(45) Date of Patent: Mar. 23, 2021

(54) SYSTEM AND METHOD TO RETAIN BASEBOARD MANAGEMENT CONTROLLER REAL-TIME CLOCK TIME DURING BMC REBOOT

(71) Applicant: DELL PRODUCTS L.P., Round Rock, TX (US)

(72) Inventors: Akkiah Choudary Maddukuri, Austin, TX (US); Arun Muthaiyan, Round Rock, TX (US); Alaric Joaquim Narcissius Silveira, Austin, TX (US); Robert T. Stevens, IV, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 112 days.

(21) Appl. No.: 16/044,894

(22) Filed: Jul. 25, 2018

(65) Prior Publication Data
US 2020/0033906 A1    Jan. 30, 2020

(51) Int. Cl.
G06F 1/08      (2006.01)
G06F 15/80     (2006.01)
G06F 1/14      (2006.01)
G06F 9/4401    (2018.01)

(52) U.S. Cl.
CPC .......... G06F 1/08 (2013.01); G06F 1/14 (2013.01); G06F 9/4405 (2013.01); G06F 15/80 (2013.01)

(58) Field of Classification Search
CPC . G06F 1/08; G06F 1/14; G06F 9/4405; G06F 15/80
See application file for complete search history.

(56) References Cited

U.S. PATENT DOCUMENTS

| 7,197,657 | B1 |  3/2007 | Tobias |
| 7,203,829 | B2* | 4/2007 | Lim ................. G06F 9/4405 713/1 |
| 7,409,557 | B2 |  8/2008 | Teppler |
| 8,868,914 | B2 | 10/2014 | Teppler |

(Continued)

FOREIGN PATENT DOCUMENTS

| EP | 2607987 | 6/2013 |
| EP | 3460653 | 3/2019 |
| WO | WO-2008045044 A1 * | 4/2008 .............. G06F 8/65 |

OTHER PUBLICATIONS

[Online] Retrieved from [http://ipxe.org/start] (Year: 2010).*

(Continued)

*Primary Examiner* — Jaweed A Abbaszadeh
*Assistant Examiner* — Hyun Soo Kim
(74) *Attorney, Agent, or Firm* — Jackson Walker LLP; Christopher J. Rourk

(57) ABSTRACT

A system with real time clock continuity is disclosed. The system includes a remote access controller configured to interoperate with a main processor and at least one second system component. The main processor is configured to receive a control from the remote access controller and to initiate a reboot after determining that a time and a tick count are stored in a memory device. The second system component is configured to store the time and the tick count in the memory device. A boot loader of the system is configured to use the time and the tick count to maintain a real time clock during the reboot of the main processor.

19 Claims, 2 Drawing Sheets

(56) References Cited

U.S. PATENT DOCUMENTS

| | | | |
|---|---|---|---|
| 9,122,810 B2 | 9/2015 | Hormuth et al. | |
| 9,882,969 B2 | 1/2018 | Reddy et al. | |
| 2005/0160272 A1 | 7/2005 | Teppler | |
| 2006/0294593 A1* | 12/2006 | Eldar | G06F 1/14 |
| | | | 726/26 |
| 2009/0055157 A1 | 2/2009 | Soffer | |
| 2011/0029798 A1* | 2/2011 | Munjal | G06F 1/3203 |
| | | | 713/340 |
| 2012/0126790 A1* | 5/2012 | Sobotka | G01D 4/002 |
| | | | 324/119 |
| 2013/0003757 A1* | 1/2013 | Boatright | H04J 3/0697 |
| | | | 370/474 |
| 2014/0095918 A1* | 4/2014 | Stahl | G06F 21/725 |
| | | | 713/500 |
| 2016/0103688 A1 | 4/2016 | Zhang et al. | |

OTHER PUBLICATIONS

Syn1588 PCIe NIC, Retrieved from [https://www.oreganosystems.at/products/syn1588/hardware/syn1588r-pcie-nic] (Year: 2017).*
Intel® Xeon Phi™ Coprocessor System Software Developers Guide, Intel Corporation, Mar. 2014 (Year: 2014).*
Micromint USA, Domino-2 microcontroller, Retrieved from [http://www.micromint.com/] (Year: 2001).*
[Online] RootUsers Retrieved from [https://www.rootusers.com/how-to-restart-windows-server-2016/] (Year: 2016).*
Microsoft Computer Dictionary, Fifth Edition, Microsoft Press, Mar. 2002 (Year: 2002).*
PDP-8 Small computer Handbook 1972 "p. 7-25" (Year: 1972).*

* cited by examiner

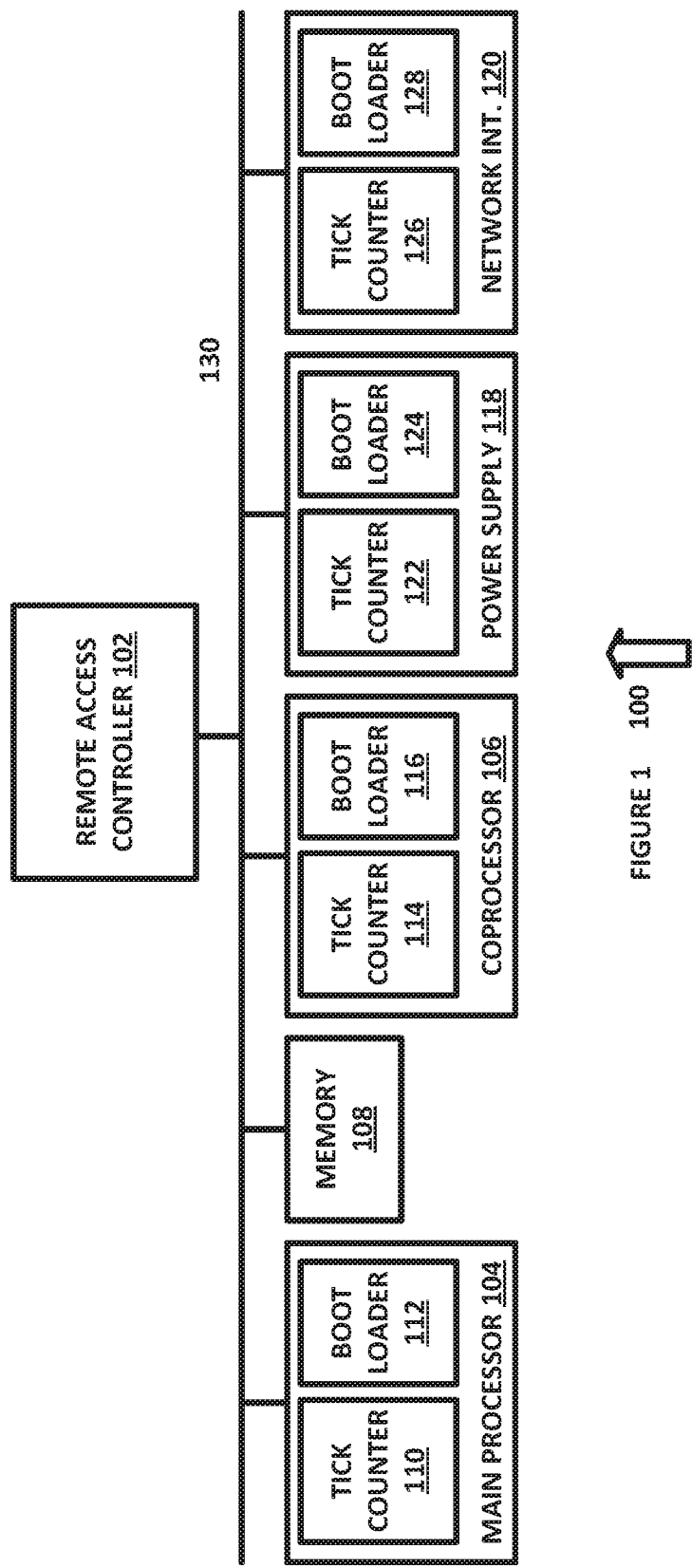

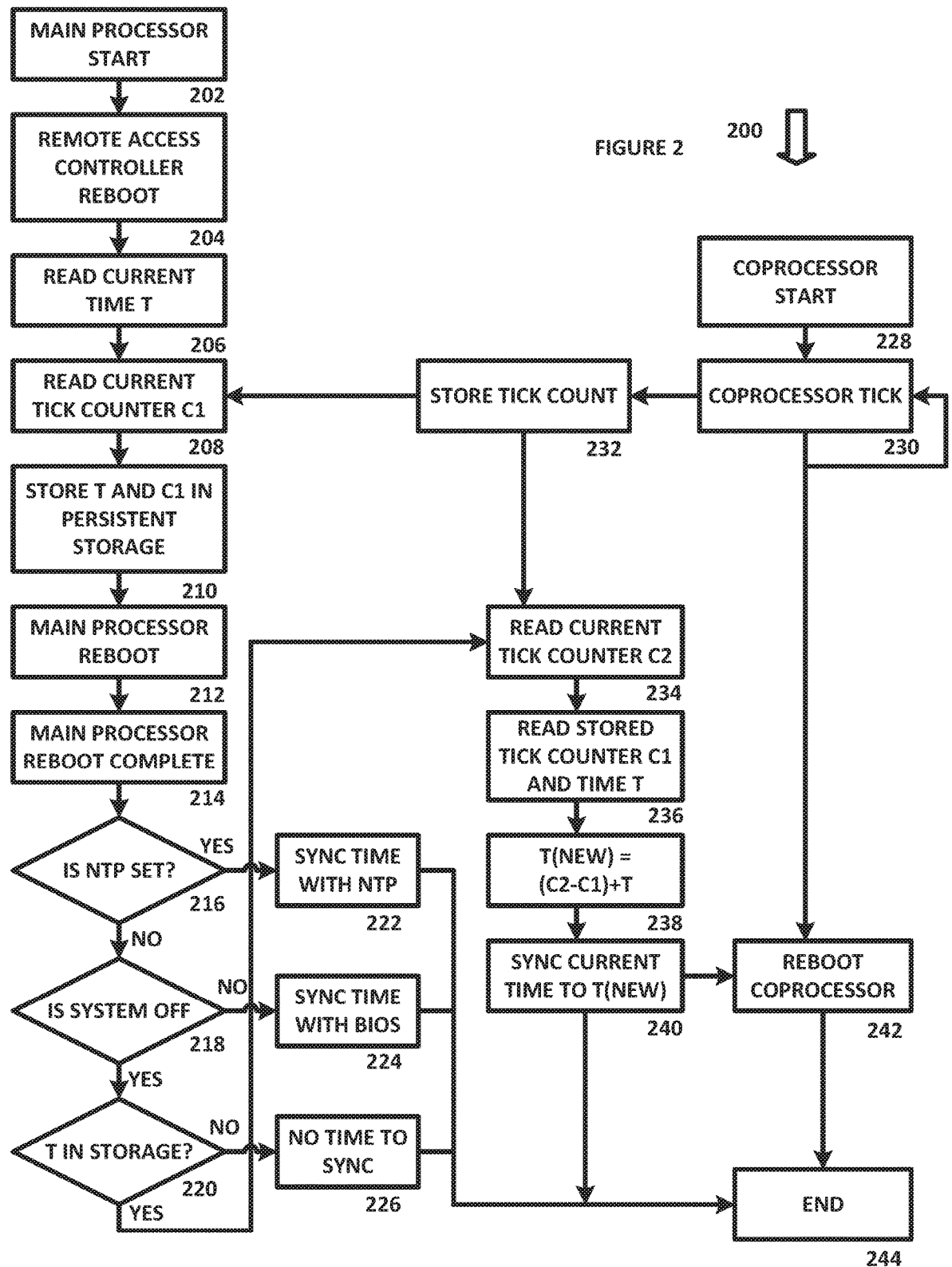

US 10,955,872 B2

SYSTEM AND METHOD TO RETAIN BASEBOARD MANAGEMENT CONTROLLER REAL-TIME CLOCK TIME DURING BMC REBOOT

TECHNICAL FIELD

The present disclosure relates generally to clock management, and more specifically to a system and method to retain a baseboard management controller (BMC) real-time clock (RTC) during rebooting of the BMC.

BACKGROUND OF THE INVENTION

Clock management is an important aspect of system control, but due to differences in system architecture, specific processes for managing clock times depend on the specific design of any given system, and cannot be generally applied using ordinary skill. Instead, knowledge of the specific system design requirements is needed.

SUMMARY OF THE INVENTION

A system with real time clock continuity is disclosed. The system includes a remote access controller configured to interoperate with a main processor and at least one second system component. The main processor is configured to receive a control from the remote access controller and to initiate a reboot after determining that a time and a tick count are stored in a memory device. The second system component is configured to store the time and the tick count in the memory device. A boot loader of the system is configured to use the time and the tick count to maintain a real time clock during the reboot of the main processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system for managing a real-time clock, in accordance with an example embodiment of the present disclosure; and FIG. 2 is a diagram of an algorithm for managing a real-time clock, in accordance with an example embodiment of the present disclosure.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

For some microprocessors, such as Intel, a remote access controller such as the integrated Dell Remote Access Controller (iDRAC) can obtain a clock time for the processor from a node manager module. For other processors, such as AMD, there is no equivalent clock time management functionality. When a complex, multi-processor system (such as a server) that utilizes different processors and a remote access controller having a similar configuration to a system that uses Intel and AMD processors and an iDRAC is in an OFF state, and a user initiates remote access controller reboot through any user interface, there will be no option for the remote access controller to retrieve system time, because of these known differences in processors. In addition, even the iDRAC does not presently have access to real-time clock hardware, and cannot synchronize to a time source until system power has been turned on. This problem with time synchronization can cause issues for any time-sensitive applications within iDRAC, or for other remote access controllers for complex systems. For example, a lifecycle log entry of the remote access controller will have out of synchronization entries if the clock time is not properly managed.

To address these and other previously-unidentified problems identified herein, the following systems and methods are disclosed. In a first method, a co-processor for the remote access controller can be used to maintain the time base while a main processor is rebooting, and the main processor can then obtain the time base back from the co-processor after reboot. In one example, the reset script of the remote access controller can cause the main processor to save the current time and the current co-processor time-stamp counter (or "tick" counter) in a co-processor shared memory. The main processor can then reset itself without resetting the co-processor, and when the main processor boot loader reactivates after the reboot, it can detect that it has rebooted as part of a remote access controller reboot, and that the coprocessor has not been reset. The main processor boot loader can then read the current co-processor tick counter and the stored tick counter and stored time. The main processor can then calculate a new time, such as by using the following algorithm, or a different suitable algorithm:

new time=(current_tick_count−stored_tick_count)+stored_time; //Should handle overflow of tick count The co-processor can then be rebooted, and it can use the main processor time for any time logs or other processes that require accurate time management.

In another example system and method, an auxiliary device like a power supply unit or network interface controller can be used, with appropriate adjustments to the type of data that is stored and the process that is used during reboot. The present disclosure thus provides a cost effective method to synchronize small device firmware time across system resets for large systems with multiple different time keeping entities.

FIG. 1 is a diagram of a system 100 for managing a real-time clock, in accordance with an example embodiment of the present disclosure. System 100 includes remote access controller 102, main processor 104, coprocessor 106, power supply unit 118, network interface controller 120, tick counters 110, 114, 122 and 126, boot loaders 112, 116, 124 and 128, memory 108 and network 130, each of which can be implemented in hardware or a suitable combination of hardware and software.

Remote access controller 102 can be an iDRAC or other suitable remote access controllers that provide external system control to a complex system, such as a server. In one example embodiment, remote access controller 102 can receive a control over network 130 that causes a system reboot, and in conjunction with one or more of boot loaders 112, 116, 124 and 128, causes a time value from main processor 104 and a tick value from one or more of tick counters 110, 114, 122 and 126 to be stored to memory 108 or other suitable memory devices.

Main processor 104 is a central processing unit and associated operating system components that are configured to interface with remote access controller 102, coprocessor 106, power supply unit 118 and network interface controller 120 over network 130. In one example embodiment, main processor 104 can receive commands from remote access controller 102 and can interface with coprocessor 106, power supply unit 118 and network interface controller 120 over network 130 in response to those commands, as discussed herein in greater detail.

Coprocessor 106 is a central processing unit and associated operating system components that are configured to interface with remote access controller 102, main processor 104, power supply unit 118 and network interface controller 120 over network 130. In one example embodiment, coprocessor 106 can receive commands from remote access controller 102 and can interface with main processor 104, power supply unit 118 and network interface controller 120 over network 130 in response to those commands, as discussed herein in greater detail.

Power supply unit 118 is a power supply unit and associated operating system components that are configured to interface with remote access controller 102, main processor 104, coprocessor 106 and network interface controller 120 over network 130. In one example embodiment, power supply unit 118 can receive commands from remote access controller 102 and can interface with main processor 104, coprocessor 106 and network interface controller 120 over network 130 in response to those commands, as discussed herein in greater detail.

Network interface controller 120 is a network interface control system and associated operating system components that are configured to interface with remote access controller 102, main processor 104, coprocessor 106 and power supply unit 118 over network 130. In one example embodiment, network interface controller 120 can receive commands from remote access controller 102 and can interface with main processor 104, coprocessor 106 and power supply unit 118 in response to those commands, as discussed herein in greater detail.

Tick counters 110, 114, 122 and 126 are time stamp counters used by main processor 104, coprocessor 106, power supply unit 118 and network interface controller 120, respectively, and are used to generate a suitable time stamp counter that can be stored in memory 108 in conjunction with a clock time value from main processor 104 or other suitable system time references. In one example embodiment, tick counters are not required to comply with rigorous network timing protocols, such as the Network Time Protocol (NTP), the Simple Network Time Protocol (SNTP) or other complex high accuracy timing protocols, and thus provide the technical advantage of being able to be used to provide real time clock functionality for a complex system without the need for high accuracy timing systems.

Boot loaders 112, 116, 124 and 128 are systems that are used in conjunction with main processor 104, coprocessor 106, power supply unit 118 and network interface controller 120, respectively, to load an operating system when one or more of main processor 104, coprocessor 106, power supply unit 118 and network interface controller 120 are turned on. In one example embodiment, each of boot loaders 112, 116, 124 and 128 can be configured to interface with remote access controller 102 and one or more of main processor 104, coprocessor 106, power supply unit 118 and network interface controller 120, such as to allow each of main processor 104, coprocessor 106, power supply unit 118 and network interface controller 120 to be restarted in sequence, while maintaining a single real time clock. Boot loaders 112, 116, 124 and 128 thus provide the technical advantage of supporting a real time clock in a complex system without the need for high-accuracy time protocols to also be used, which would require the different clocks to be continuously synchronized and which would require a substantial amount of processing and data overhead to maintain.

Memory 108 is a memory device that is configured to be used by one or more of remote access controller 102, main processor 104, coprocessor 106, power supply unit 118 and network interface controller 120. In one example embodiment, memory 108 can be used to store clock time data, time stamp counter data and other suitable data as discussed further herein.

Network 130 can be a suitable data communications network or bus for inter-component communications in a complex environment, such as a server. Network 130 can be a network, a data bus, a dedicated communications channel, a network of point to point communications device or other suitable communications media between components in a complex system.

In operation, system 100 provides the technical advantage of facilitating a real time clock during a complex system reboot, without the need for high accuracy timing protocols. Thus, system 100 allows continuity in time logs and other time-sensitive applications to be maintained during a system reboot without more expensive time synchronization processes and systems.

FIG. 2 is a diagram of an algorithm 200 for managing a real-time clock, in accordance with an example embodiment of the present disclosure. Algorithm 200 can be implemented in hardware or a suitable combination of hardware and software, and be one or more software-implemented processes operating on one or more special purpose processors.

Algorithm 200 begins at 202, where a main processor starts the reboot process. In one example embodiment, the main processor can receive a start command from a user accessing the system using a remote access controller, or in other suitable manners. The algorithm then proceeds to 204.

At 204, a remote access controller is rebooted. In one example embodiment, algorithm 200 can be implemented in conjunction with a system reboot that is initiated through a remote access controller, but other suitable systems and processes can also or alternatively be used to coordinate a system reboot, such as a local access controller. The algorithm then proceeds to 206.

At 206, a current time T is read. In one example embodiment, the current time T can be read from a main processor clock or other suitable clocks. The algorithm then proceeds to 208.

At 208, a value of a current time stamp counter, tick counter or other suitable local counters C1 can be read. In one example embodiment, the counter can be read from a coprocessor, a network interface card, a power supply unit or other suitable systems or components that will provide a default real time clock while a main processor is rebooted. The algorithm then proceeds to 210.

At 210, the values of T and C1 are stored in a persistent data storage device. In one example embodiment, a random access memory device or other suitable devices can be used to store T, C1 and other suitable data. The algorithm then proceeds to 212.

At 212, the main processor or other suitable processor is rebooted. In one example embodiment, when a main processor and one or more other coprocessors, network interface controllers, power supply units or other systems or components are used in the system, the main processor can be the first processor restarted as part of a system reboot, or other suitable orders of restart can also or alternatively be used. The algorithm then proceeds to 214.

At 214, the main processor or other suitable processor reboot is completed. In one example embodiment, the reboot can be controlled by a boot loader program, and completion of the reboot process can be a point in the boot loader program operation at which algorithm 200 proceeds to 216 or other suitable steps. The algorithm then proceeds to 216.

At 216, it is determined whether a network time protocol has been set. While the network time protocol or other similar timing protocols do not need to be used with the present disclosure, to the extent that they are used and available, then the present disclosure allows such protocols to be used. If it is determined that the network time protocol has been set, the algorithm proceeds to 222, where time is synchronized to the network time protocol, and the algorithm then terminates at 244. Otherwise, the algorithm proceeds to 218.

At 218, it is determined whether the system is off. If it is determined that the system is not off, the algorithm proceeds to 224 where the time is synchronized with the basic input-output system or BIOS, and the algorithm then terminates at 244. Otherwise, the algorithm proceeds to 220.

At 220, it is determined whether a time T has been stored in the data storage device. If no value of time T is stored, the algorithm proceeds to 226 where it is determined that there is no time to synchronize to, and the algorithm proceeds to 224 and terminates. Otherwise, the algorithm proceeds to 234.

In addition, a coprocessor can be started at 228, where a coprocessor is present, and a current time stamp counter, tick counter or other suitable local counter can be started at 230 and cycled. Where a coprocessor is present, the algorithm can proceed to 232, where the current time stamp counter, tick counter or other suitable local counter can be stored. In addition, the algorithm proceeds from 230 to 242 when the processor reboots.

At 234, a value of a current time stamp counter, tick counter or other suitable local counters C2 can be read. In one example embodiment, the reading can be obtained from the same tick counter or other suitable local counter that was used to obtain C1. The algorithm then proceeds to 236.

At 236, the stored tick counter or other suitable local counter C1 and stored time T is read from the memory, and the algorithm then proceeds to 238, where a new value of T is determined based on the difference between C2 and C1 and the old value of T. The algorithm then proceeds to 240.

At 240, the system time is synchronized to the new value of T, and the process either proceeds to 242, where a coprocessor is rebooted (if present), or proceeds to 244 and terminates. If a coprocessor is rebooted at 242, the process then terminates after the coprocessor reboots at 244.

Although algorithm 200 is shown as a flow chart, one or more flow charts, one or more state machines, one or more objects or agents, one or more threads, a suitable combination of these programming paradigms or other suitable programming paradigms can also or alternatively be used to implement algorithm 200.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system with real time clock continuity, comprising:
    a remote access controller configured to interoperate with a main processor and at least one second data processing system component of a single multi-processor system;
    the main processor configured to receive a control from the remote access controller and to initiate a reboot after determining that a time and a tick count are stored in a memory device;
    the at least one second data processing system component configured to store the time and the tick count in the memory device; and
    wherein a boot loader operating on a processor is configured to use the time and the tick count to maintain a real time clock during the reboot of the main processor,
    wherein the boot loader comprises a boot loader operating on the main processor and further comprising a second tick counter that generates a second tick count that is different from the tick count, and wherein the boot loader is configured to use the time, the tick count and the second tick count to maintain the real time clock and to maintain continuity in an application at the remote access controller.

2. The system of claim 1 wherein the at least one second data processing system component further comprises a coprocessor generating the second tick count that is different from the tick count and the boot loader comprises a boot loader of operating on the coprocessor and to maintain continuity during reboot.

3. The system of claim 2 wherein the at least one second data processing system component further comprises a power supply unit generating a third tick count that is different from the tick count and the second tick count and the boot loader comprises a boot loader operating on the power supply unit.

4. The system of claim 1 wherein the at least second data processing system component is a network interface controller and the boot loader comprises a boot loader operating on the network interface controller.

5. The system of claim 1 wherein the at least second data processing system component is a coprocessor and the boot loader comprises a boot loader operating on the coprocessor and a boot loader of the main processor, and wherein the boot loader operating on the coprocessor is configured to use the time and the tick count to maintain continuity in an application at the remote access controller.

6. The system of claim 1 wherein the at least second data processing system component is a power supply unit and the boot loader comprises a boot loader operating on the power supply unit and a boot loader of the main processor, and wherein the boot loader operating on the power supply unit is configured to use the time and the tick count to maintain continuity in a log application at the remote access controller.

7. The system of claim 1 wherein the at least second data processing system component is a network interface controller and the boot loader comprises a boot loader operating on the network interface controller and a boot loader of the main processor.

8. A method for providing real time clock continuity in a system, comprising:
    receiving a system reboot command from a remote access controller;
    storing a first clock value from a main processor in a memory;
    storing a first tick counter value from a second system component in the memory;
    rebooting the main processor;
    reading a second tick counter value from the second system component;
    determining a second clock value using the first clock value, the first tick counter value and the second tick counter value; and
    using the second clock value to maintain continuity in an application of the remote access controller.

9. The method of claim 8 wherein storing the first tick counter value from the second data processing system component in the memory further comprises storing the second tick counter value from a coprocessor in the memory that is different from the first tick counter value using a boot loader of the main processor.

10. The method of claim 9 wherein storing the first tick counter value from the second system component in the memory further comprises storing a third tick counter value from a network interface controller in the memory that is different from the first tick counter value and the second tick counter value.

11. The method of claim 8 wherein the storing, reading and determining steps are omitted if it is determined that a real time protocol clock value is available.

12. The method of claim 8 wherein determining the second clock value using the first clock value, the first tick counter value and the second tick counter value comprises adding a difference between the second tick counter value and the first tick counter value to the first clock value to yield the second clock value.

13. A system with real time clock continuity, comprising:
a remote access controller configured to interoperate with a main processor and at least one second data processing system component of a single multi-processor system;
the main processor configured to receive a control from the remote access controller and to initiate a reboot after determining that a time and a tick count are stored in a memory device;
the at least one second data processing system component of the main processor configured to store the time and the tick count in the memory device; and
means for using the time and the tick count to maintain a real time clock during the reboot of the main processor and to maintain time continuity at the remote access controller for an application associated with the single multi-processor system.

14. The system of claim 13 wherein the means for using the time and the tick count to maintain a real time clock during the reboot of the main processor comprises a boot loader operating on the main processor.

15. The system of claim 13 wherein the means for using the time and the tick count to maintain a real time clock during the reboot of the main processor comprises a boot loader operating on a coprocessor.

16. The system of claim 13 wherein the means for using the time and the tick count to maintain a real time clock during the reboot of the main processor comprises a boot loader operating on a power supply unit.

17. The system of claim 13 wherein the means for using the time and the tick count to maintain a real time clock during the reboot of the main processor comprises a boot loader operating on a network interface controller.

18. The system of claim 13 wherein the means for using the time and the tick count to maintain a real time clock during the reboot of the main processor comprises a boot loader operating on a coprocessor and a boot loader of the main processor.

19. The system of claim 13 wherein the means for using the time and the tick count to maintain a real time clock during the reboot of the main processor comprises a boot loader operating on a power supply unit and a boot loader of the main processor.

\* \* \* \* \*